United States Patent [19]

Rowlson et al.

[11] 4,043,012
[45] Aug. 23, 1977

[54] AXIALLY AND RADIALLY ADJUSTABLE CUTTER INSERT FOR ROTARY CUTTING TOOL

[75] Inventors: Peter C. Rowlson, Eugene, Oreg.; Thomas J. Kuhl, Santa Claus, Ind.

[73] Assignee: North American Products Corporation, Atlanta, Ga.

[21] Appl. No.: 632,681

[22] Filed: Nov. 17, 1975

[51] Int. Cl.$^2$ .............................................. B26D 1/28
[52] U.S. Cl. .................................. 29/105 R; 144/218; 144/230
[58] Field of Search ................. 29/105 R, 105 A, 104; 144/117 R, 218, 230, 114 R, 162 R, 172, 174, 321, 231; 241/292.1, 294, 282.1, 282.2

[56] References Cited

U.S. PATENT DOCUMENTS

| 1,934,465 | 11/1933 | Hillner | 29/105 R |
| 2,408,787 | 10/1946 | Lowell | 29/105 R |
| 3,268,178 | 8/1966 | Schoeppner | 144/218 X |
| 3,866,844 | 2/1975 | Montgomery | 144/230 X |

FOREIGN PATENT DOCUMENTS

| 346,018 | 6/1960 | Switzerland | 144/230 |
| 405,440 | 2/1934 | United Kingdom | 144/230 |

*Primary Examiner*—Othell M. Simpson
*Assistant Examiner*—W. D. Bray
*Attorney, Agent, or Firm*—Ira Milton Jones & Associates

[57] ABSTRACT

The head of a rotary cutting tool has an axially extending slot defining a flat, radially outwardly facing bottom surface and opposite undercut side surfaces, at least one of which makes an acute angle to the bottom surface. A cutter insert has a lower base portion in the slot and a cutting edge on an upper portion. The base portion comprises two wedging elements having opposite complementary tapers in width along their lengths to be relatively lengthwise adjustable for varying the width of the base portion. One wedging element is integral with said upper portion and is releasably maintained under radially outward force to be wedged between the other element and said side surface of the slot, thus holding the cutting edge at a distance from the tool axis determined by the lengthwise adjustment of the wedging elements.

8 Claims, 4 Drawing Figures

AXIALLY AND RADIALLY ADJUSTABLE CUTTER INSERT FOR ROTARY CUTTING TOOL

This invention relates to cutting tools of the type comprising a rotatable tool head and a cutter insert which is received in an xially elongated slot in the tool head to be adjustable therealong; and the invention is more particularly concerned with a cutting tool of that type wherein the cutter insert is adjustable radially relative to the tool head as well as axially along it, so that a cutting edge on the cutter insert can be established at any selected one of a number of different distances from the axis of the tool head and at any selected position along its axis.

An example of the type of cutting tool with which this invention is concerned is a moulder head that has axially extending rows of teeth at circumferentially spaced intervals around it to provide cutting edges which enable the moulder head to plane one surface of a board that is moved lengthwise under the tool as it is rotating. These cutting edges on the moulder head are all spaced at uniform distances from its axis so that they cooperate to produce a flat finished surface on the board. To enable the moulder head to produce a lengthwise extending groove in that flat surface simultaneously with the planing of it, the moulder head is provided with circumferentially spaced axially extending slots, each located circumferentially between rows of teeth and each adapted to receive a cutter insert which has its cutting edge farther from the tool axis than the cutting edges on the head itself. The head is usually provided with two or more of such slots, at uniform circumferential intervals around it, to provide a balance arrangement of cutter inserts.

A moulder head having slots for cutter inserts is a very versatile tool. It can be used for planing boards either with or without grooves, depending upon whether or not cutter inserts are used, and it can produce a groove at any desired location across the board, depending upon the positions of the cutter inserts along their slots. With the use of different cutter inserts, grooves of different configurations and sidths can be produced, and the groove cut by an insert can have any transverse profile that can be defined by grinding the insert cutting edge.

In prior rotary tools with cutter inserts, the cutter insert was adjustable relative to the tool head in axial directions but was not adjustable radially. As a rule, the cutting edges on cutter inserts have to be sharpened more frequently than the cutting edges on the moulder head itself, owing to the lesser number of insert cutter edges around the circumference of the tool and the consequently greater wear on them. But sharpening the insert cutters decreases the radius of their cutting edges, and since the insert cutter was not adjustable radially, one or a few sharpenings of the insert cutters compelled regrinding of the cutting edges on the moulder head itself, even though the moulder head edges were still sharp enough for effective cutting. Furthermore, since a fixed difference in radius had to be maintained between the insert cutting edges and the moulder head cutting edges, each insert cutter was more or less custom fitted to a particular moulder head — or, more accurately, each moulder head was ground for cooperation with a particular set of cutter inserts — and therefore the moulder head was out of service whenever its cutter inserts were being sharpened. Of course lack of radial adjustability also decreased the potential versatility of cutter inserts because any change in the depth of the groove to be cut with a cutter insert necessitated either a resharpening of the cutter insert or the use of a different one.

It is possible that the art did not heretofore appreciate the advantages to be gained from radial adjustability of cutter inserts, owing to the versatility of the tool even without that feature. It is more likely, however, that the benefits of radial adjustability of the cutter insert were evident enough, but that it was not obvious how those benefits could be attained, at least not without sacrifice of other desirable features.

The cutter insert must be received in a relatively small slot in the tool head, and therefore the portion of it that is seated in that slot must be very compact. The cutter insert is of course subjected to high stress forces when the tool is in operation, and therefore any expedient that provides for radial adjustability of its cutting edge must not compromise the structural strength of the insert. To be really useful, any arrangement that provides for radial adjustability of the cutter insert must enable such adjustment to be accomplished quickly and easily and in very small increments through a substantially large range of adjustments. The problem of providing a satisfactory radially adjustable cutter insert was of course further complicated by the need for fulfilling all of these requirements in a structure that was not unduly expensive. But there was an important further consideration that seemed to negative the very possibility of obtaining such adjustability: from a safety standpoint the cutter insert should be so confined in the tool head that it cannot be expelled from it under centrifugal force generated by rotation of the tool at high speeds.

The general object of the present invention is to provide a radially adjustable cutter insert adapted to be received in an axially extending slot in a rotatable tool head, which cutter insert nicely satisfies all of the requirements set forth above and enables a cutting edge thereon to be established at any of a number of different distances from the axis of the tool head as well as at any desired position along that axis within the lengthwise limits of the slot.

Another and more specific object of this invention is to provide a rotatable tool comprising a tool head with an axially extending slot and a cutter insert which is received in that slot and which is quickly and easily adjustable both radially and axially relative to the tool head, the insert comprising two complementary parts, one of which comprises the cutter portion of the insert on which it has its cutting edge and the other being a simple and compact wedging element, said two parts being cooperable with one another and with side surfaces of the slot in the tool head to afford a compound wedging relationship whereby both parts are securely locked into the slot and the cutting edge can be established at any selected one of a plurality of different distances from the tool axis as well as at any one of a range of positions along that axis.

It is a further specific object of this invention to provide a rotary tool of the character described wherein the cutter insert has a base portion which is received in the slot in the tool head and cooperates with a wedging element that is also confined in said slot, wherein the wedging element is adjustable relative to the base portion in directions lengthwise of the slot to control the radial distance between the tool axis and a cutting edge on the insert, and wherein the base portion and the wedging element are provided with simple cooperating means, operative in consequence of their engagement with one another, for confining them in any selected position of lengthwise relative adjustment.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which.

Figure 1:
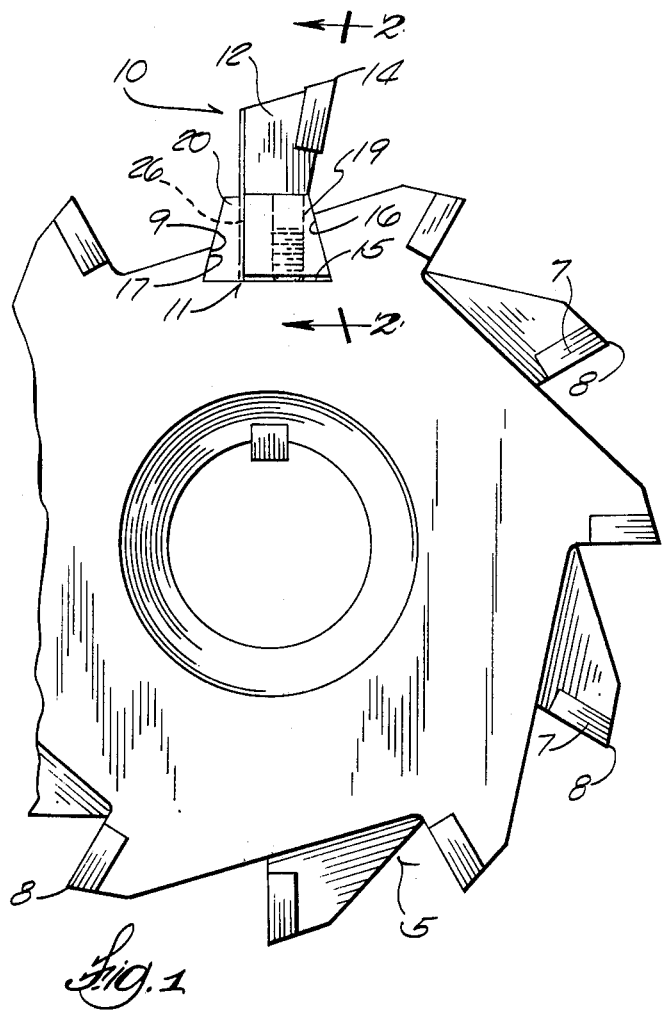
FIG. 1 is an end view of a rotary cutting tool equipped with a radially and axially adjustable cutter insert embodying the principles of this invention.
Figure 2:
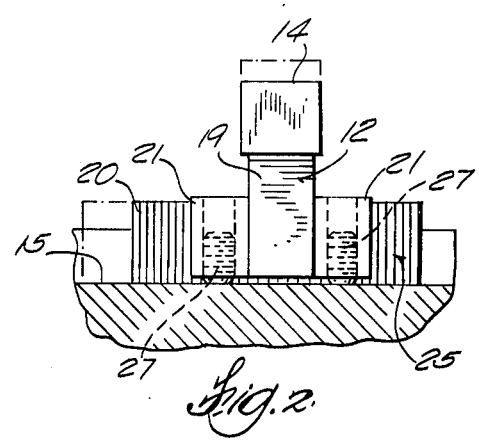
FIG. 2 is a fragmentary sectional view taken on the plane of the line 2—2 in FIG. 1.
Figure 3:
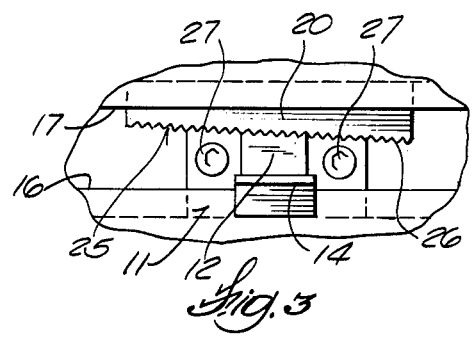
FIG. 3 shows the cutter insert in relation to its adjacent portions of the cutting tool, looking radially towards the cutting tool.
Figure 4:
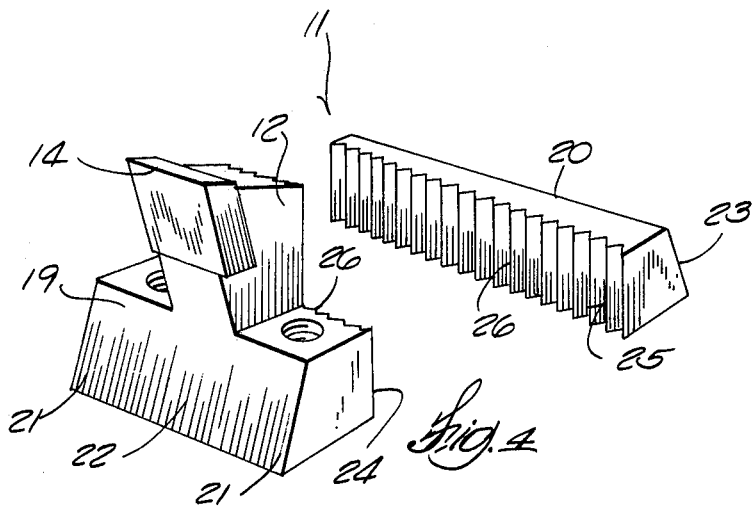
FIg. 4 is an exploded perspective view of the cutter insert by itself.

Referring now to the accompanying drawing, the numeral 5 designates generally a rotary tool which embodies the principles of the present invention and which is here illustrated as a moulder head having numerous fixed cutting teeth 7, each of which has a cutting edge 8. The teeth are distributed around the circumference and along the axis of the tool head, being arranged in circumferentially spaced axially extending rows. The cutting edges on the several teeth in a row thereof all lie on a line which is parallel to the axis of the tool, and the cutting edges on all of the teeth are all at the same distance from the tool axis, to cooperate in producing a flat finished surface on a board or the like that is moved lengthwise in engagement with the rotating tool.

Between two circumferentially adjacent rows of teeth the tool head has a radially outwardly opening axially extending slot 9 in which a cutter insert 10 is removably received. It will be understood that although only one such slot and cutter insert are shown, the tool will ordinarily have two or more such slots, in each of which a cutter insert may be received, and that the slots are circumferentially equispaced around the tool head so that the tool is balanced as it rotates.

The cutter insert comprises, in general, a mounting portion 11 which is intended to be confined in the slot 9 and which can be regarded as a lower portion of the insert, and a cutter portion 12 which projects radially out of the slot and which can be regarded as an upper portion of the insert. A cutting edge 14 if formed on the upper cutter portion of the insert, and in the case of a cutter insert for a moulding cutter that cutting edge will ordinarily be located at a substantially greater distance from the tool axis than the cutting edges 8 on the fixed teeth 7.

The slot 9 in the tool head extends along at least a substantial part of the length thereof. The slot is so formed as to have a bottom surface 15 that faces radially outwardly and opposite side surfaces 16 and 17 which are undercut so that the slot is narrower at its mouth than radially inwardly thereof. Preferably, as shown, the bottom surface 15 of the slot is flat and is normal to a plane that lies on the axis of the tool and is located midway between the side surfaces 16 and 17. The side surface 16 of the slot, which can be regarded as its front surface, is flat from near the bottom surface 15 to near the mouth of the slot and, in the preferred case illustrated, makes an acute angle with the flat bottom surface 15 to be in radially outwardly convergent relation to the plane just mentioned, i.e., inclined rearwardly and upwardly. In the illustrated embodiment, the other or rear side surface 17 of the slot is likewise flat and is undercut by reason of its mkaing an opposite acute angle to the flat bottom surface and being in opposite radially outwardly convergent relation to the aforesaid plane, i.e., inclined forwardly and upwardly.

It will be understood that because the side surfaces 16 and 17 are undercut, the slot must open to at least one end of the tool head so that the cutter insert can be moved lengthwise into the slot from an open end thereof.

The mounting portion 11 of the cutter insert is formed as two complementary parts 19 and 20 that have a compound wedging cooperation with one another and with the slot side surfaces, as explained hereinafter, to provide for adjustability of the radial position of the insert cutting edge 14 and to lock the insert into the slot. One of those complementary parts, designated by 19, can be regarded as a front wedging element which is formed integrally with the cutter portion 12 of the insert and which can thus be considered a base portion of the insert proper. The other part 20 of the mounting portion comprises a rear wedging element. Both wedging elements are preferably substantially elongated in the derection lengthwise of the slot 9, and it is preferred that the front wedging element 19 have portions 21 which project lengthwise in opposite directions beyond the upper cutter portion 12 thereabove.

The front wedging element has a lengthwise extending front surface 22 which is flat and which is adapted to have flatwise engagement with the flat surface 16 that defines the front side of the slot. The rear wedging element 20 has rear surface portions 23 which are formed to mate with the undercut rear surface 17 of the slot and, by their cooperation therewith, to confine the rear wedging element against upward (i.e., radially outward) displacement in the slot. In the preferred embodiment here illustrated, said rear surface portions 23 comprise a flat, lengthwise extending surface on the rear wedging element that is forwardly and upwardly inclined at such an angle as to flatwise engage the correspondingly inclined rear slot surface 17.

The two wedging elements that comprise the mounting portion 11 are separable along a plane defined by flatwise opposing surfaces on them, namely a substantially falt rear surface 24 on the front wedging element and a substantially flat front surface 25 on the rear wedging element. In the preferred embodiment, in which the slot has a flat bottom surface 15 that is oriented as described above, the plane of the opposing surfaces 24 and 25 is substantially normal to that bottom surface. In general, the plane of the opposing surfaces 24 and 25 is so oriented vertically that the front surface 16 on the front wedging member is in upwardly convergent relation to it, so that upward displacement within the slot of the cutter insert proper causes the front wedging element 19 to be wedged between the inclined front surface 16 of the slot and the substantially flat front surface 25 of the rear wedging element. The reaction of the rear wedging element to such wedging tends to maintain the rear surface portions 23 thereon in engagement with the undercut rear surface 17 of the slot, to thereby confine the rear wedging element against upward displacement.

In the direction lengthwise of the slot, the plane of the opposing surfaces 24 and 25 is oblique to the front and rear surfaces 22 and 23 on the front and rear wedging elements 19 and 20, respectively, so that each of the wedging elements tapers in width in one direction along its length. However, the tapers of the wedging elements are in opposite directions, and and angles of lengthwise inclination of their respective opposing surfaces 24 and 25 are complementary.

It will be evident that the overall width of the mounting portion 11 — that is, the distance between its front surface 22 and its rear surface 23 — can be varied by lengthwise adjustment of the wedging elements relative to one another. It will also be evident that owing to the complementary tapers of the wedging elements, said surfaces 22 and 23 of the mounting portion will always maintain the same orientation relative to one another so long as the inclined surfaces 24 and 25 on the wedging elements are properly flatwise engaged and irrespective of the position of relative lengthwise adjustment of those elements.

Because the front wedging element 19 that comprises the base portion of the cutter insert proper has a wedging relationship to the rear wedging element 20 and the front surface 16 of the slot, relative lengthwise adjustment of the wedging elements, to effect adjustment of the overall width of the mounting portion 11, controls the height to which the cutter insert can be displaced upwardly in the slot — which is to say that such adjustment controls the distance between the tool axis and the cutting edge 14 on the insert.

Because there is a wedging relationship between the two wedging elements that tends to displace them lengthwise relative to one another, owing to the lengthwise inclination of their opposing surfaces 24 and 25, they are provided with cooperating means for preventing such displacement, rendered operative upon flatwise engagement of said surfaces. As shown, that means takes the form of a series of ridges 26 which extend transversely across each of said surfaces. The ridges 26 thus extend lengthwise in the radial direction, or perpendicular to the bottom of the slot. As shown, each ridge is V-shaped in profile, with its side faces disposed at opposite 45° angles to the plane of the opposing surfaces 24, 25; and laterally adjacent ridges on each of those surfaces define corresponding grooves in which the ridges on the opposing surface are closely receivable. The ridges are of course spaced along the surfaces 24 and 25 at small uniform intervals so that the wedging elements are adjustable lengthwise relative to one another in small increments. Due to the inclinations of the surfaces involved in the above described compound wedging relationship, each increment of such adjustment, even though relatively large (say 0.05 or 0.06 in.), effects an adjustment of only a few thousandths of an inch in the distance between the tool axis and the cutting edge 14.

Since the cutter insert is wedgingly confined against radially outward displacement from any position of adjustment in which it is established, maintenance of a radially outward force upon the front wedging element 19 suffices to confine the cutter insert against both radial and axial displacement relative to the tool head. The means for maintaining such radially outward force should also provide for release thereof to enable axial and radial adjustment of the insert. Preferably such force maintaining means comprises a pair of vertically extending Allen head screws 27 which are threaded through the front wedging element to engage the bottom surface 15 of the slot. The screws can be received in the portions 21 of the front wedging element that extend lengthwise to opposite sides of the cutter portion 12.

From the foregoing description taken with the accompanying drawings it will be apparent that this invention provides a cutter insert for a rotary tool head that is adjustable radially relative to the tool head as well as axially along it, which cutter insert is compact, inexpensive, quickly and easily adjusted, and safe to use because it tends to lock itself against expulsion out of the tool head in response to centrifugal force.

Those skilled in the art will appreciate that the invention can be embodied in forms other than as herein disclosed for purposes of illustration.

The invention is defined by the following claims:

1. A cutter insert for a cutting tool head that has an axis and is rotatable about the same, said head also having an axially extending radially outwardly opening slot that defines a radially outwardly facing bottom surface and opposite side surfaces which extend parallel to said axis and which are undercut so that the slot is substantially narrower at its mouth than radially inwardly thereof, one of said side surfaces being flat from near said bottom surface to near the mouth of the slot, said cutter insert having a lower base portion receivable in said slot for adjustment therealong and an upper cutter portion which projects radially out of the slot and has a cutting edge that is intended to be spaced a predetermined distance from said axis, said cutter insert being characterized by:
   A. the base portion of the cutter insert
      1. having a length dimension which can be oriented lengthwise of the slot,
      2. having a lengthwise extending flat front surface that is flatwise engageable with said one side surface of the slot, and
      3. having a rear inclined surface which is in such lengthwise oblique relation to said front surface that the base portion has a taper in width in one direction along its length, said inclined surface also being in upwardly convergent oblique relation to said front surface;
   B. a wedging element complementary to said base portion and having a length dimension which can be oriented lengthwise of the slot, said wedging element
      1. having lengthwise extending rear surface portions that are formed to matingly engage the opposite undercut side surface of the slot, such engagement confining the wedging element against upward movement in the slot, and
      2. having a front inclined surface which is in such lengthwise oblique relation to its said surface portions that the wedging element has a taper in width which is opposite and complementary to said taper of the base portion, so that upon flatwise engagement of said inclined surfaces the distance between said front surface on the base portion and said rear surface portions on the wedging element can be adjusted by lengthwise movement of the wedging element relative to the base portion;
   C. cooperating means on the base portion and on the wedging element, rendered operative by flatwise engagement of their said inclined surfaces, for confining the wedging element against lengthwise movement relative to the base portion in any of a plurality of positions of such movement; and D. means for producing a relievable reaction force between the bottom surface of said slot and the base portion of the cutter insert whereby the latter is urged radially outwardly in the slot and is wedged between the wedging element and said one side surface of the slot to maintain the cutting edge at a distance from said radius that depends upon the lengthwise position of the wedging element relative to the base portion.

2. A cutter insert for a cutting tool head that has an axis and is rotatable about the same, said head further having an axially extending radially outwardly opening slot that is undercut to be narrower at its mouth than radially inwardly thereof, said slot defining a radially outwardly facing bottom surface and a wedging surface at one side of the slot which extends lengthwise parallel to said axis and is flat from near said bottom surface to near the mouth of the slot, said cutter insert having a lower elongated mounting portion receivable in said slot for axial adjustment therealong and having an upper cutter portion which projects radially beyond the head and has a cutting edge that is intended to be spaced a predetermined distance from said axis, said cutter insert being characterized by:

A. the mounting portion of the cutter insert comprising a pair of complementary lengthwise extending wedging elements, one of which is rigidly connected with the cutter portion,
  1. said elements having opposing substantially vertical surfaces, one on each element, at which they adjoin one another and which surfaces are in such oblique relation to the lengths of the elements that the elements have opposite and complementary tapers in width along their lengths so that the overall width of the mounting portion can be varied by relative lengthwise motion of said elements, and
  2. said elements being formed to cooperate in providing the mounting portion with opposite lengthwise extending confinement surfaces,
    a. one of said confinement surfaces being on said one element, being flatwise engageable against said wedging surface, and being in upwardly convergent oblique relation to said substantially vertical surface of said one element, and
    b. the other of said confinement surfaces being on the other element and being formed to mate with an undercut surface at the opposite side of the slot for cooperation therewith in confining said other element against radially outward displacement relative to the head;

B. cooperating means on said elements, rendered operative by flatwise engagement of their said substantially vertical surfaces, for confining said elements in any one of a plurality of positions of relative lengthwise adjustment; and C. means on the mounting portion for producing a relievable reaction force between said one element and the head whereby said one element is urged radially outwardly in the slot to be wedged between said other element and said wedging surface and to be maintained at a radial position that depends upon the relative lengthwise adjustment of the elements, the wedging reaction between said elements confining said other confinement surface in engagement with said undercut surface.

3. A cutting tool of the type comprising a head which is rotatable about an axis and in which there is an axially elongated radially outwardly opening slot, and a cutter insert having a mounting portion received in said slot and having a cutter portion which projects radially beyond the head and on which there is a cutting edge, said cutting tool being characterized by:

A. said slot in the head defining
  1. a bottom surface which faces radially outwardly and
  2. opposite, axially extending, undercut side surfaces that define a mouth for the slot which is of lesser width than portions of the slot inwardly thereof, one of said side surfaces being flat from near said bottom surface to near said mouth;

B. the mounting portion of the cutter insert comprising two complementary wedge-like elements, each having a length dimension extending along the slot, the cutter portion being rigidly secured to one of said elements,
  1. said elements having flatwise engaged lengthwise extending mating surfaces, one on each element, that lie on a plane which extends in a generally radial direction but is oblique to said axis so that said elements have opposite complementary taper in width to enable the overall width of the mouting portion to be varied by relative lengthwise adjustment of said elements,
  2. said one element having a flat surface which is substantially opposite its said mating surface but is inclined in radially outwardly convergent relation thereto and which is flatwise engageable with said one side surface of the slot, and
  3. said other element being so formed at its side remote from its said mating surface as to matingly engage the other undercut side surface of the slot and to be confined against radially outward displacement relative to the head by such engagement;

C. means rendered operative upon flatwise engagement of said mating surfaces for releasably confining said elements against motion relative to one another in directions lengthwise of the slot; and D. means for reacting between the head and said one element to provide a relievable force that urges said one element radially outwardly to maintain it wedged between said one side surface of the slot and said other element with the cutting edge disposed at a distance from said radius that depends upon the position of relative lengthwise adjustment of said elements.

4. The cutting tool of claim 3 wherein said other undercut side surface of the slot is flat from near the bottom of the slot to near the mouth thereof and is inlcined in radially outwardly convergent relation to said one side surface of the slot; and wherein said other element is formed at its side remote from its said mating surface with a flat surface which is radially outwardly inclined in converging relation to its said mating surface and which is flatwise engageable with said other side surface of the slot.

5. The cutting tool of claim 3 wherein said means for confining said elements against motion relative to one another comprises a plurality of ridges on each of said mating surfaces extending thereacross in the radial direction and spaced apart at uniform small intervals, the ridges on each element defining grooves in which the ridges on the other element are receivable.

6. The cutting tool of claim 3 wherein said means for reacting between the head and said one element comprises screw means threaded through said one element and extending substantially radially to engage said bottom surface of the slot.

7. A cutting tool of the type comprising a cutter insert and a tool head rotatable about an axis and in which there is an axially elongated, radially outwardly opening slot that defines a substantially flat bottom surface which faces radially outwardly and opposite axially extending flat side surfaces which are inclined at opposite acute angles to said bottom surface to be in radially outwardly convergent relation to one another, said cutter insert having an elongated mounting portion lengthwise received in said slot to be adjustable therealong and a cutter portion which projects radially beyond the tool head and has a cutting edge thereon, the mounting portion having opposite flat, lengthwise extending surfaces which are in radially outwardly convergent relation to one another to flatwise oppose the side surfaces of said slot and having radially extending screws threaded therethrough that can be tightened against said bottom surface of the slot to maintain the mounting portion in wedging engagement with said side surfaces of the slot, said tool being characterized by:

A. said mouting portion comprising two lengthwise tapering parts that are separable from one another along a plane which is substantially normal to said bottom surface of the slot and which is oblique to said axis, so that the overall width of the mounting portion can be adjusted by relative lengthwise adjustment of said parts; and B. cooperating means on said parts for holding them in any of a plurality of positions of lengthwise adjustment relative to one another that provide for establishing said cutting edge at different distances from said axis upon tightening of said screws.

8. The cutting tool of claim 7 wherein each of said parts has a surface which lies substantially on said plane, and wherein said cooperating means on said parts comprises substantially radially extending ridges on said surface on each of said parts, said ridges on each part being spaced at small uniform intervals and defining grooves in which the ridges on the other part are receivable.

* * * * *